US006170153B1

(12) United States Patent
Ichikawa

(10) Patent No.: US 6,170,153 B1
(45) Date of Patent: Jan. 9, 2001

(54) METHOD FOR GUIDING A WIRE

(75) Inventor: Masaharu Ichikawa, Yokkaichi (JP)

(73) Assignee: Sumitomo Wiring Systems, Ltd. (JP)

( * ) Notice: Under 35 U.S.C. 154(b), the term of this patent shall be extended for 0 days.

(21) Appl. No.: 09/263,179

(22) Filed: Mar. 5, 1999

Related U.S. Application Data

(62) Division of application No. 08/623,280, filed on Mar. 28, 1996, now Pat. No. 5,884,394.

(30) Foreign Application Priority Data

Apr. 3, 1995 (JP) ..................................................... 7-77955
Apr. 3, 1995 (JP) ..................................................... 7-77955

(51) Int. Cl.[7] ..................................................... B23P 19/00

(52) U.S. Cl. ................................ 29/749; 29/748; 29/760; 29/759; 29/33 M

(58) Field of Search .............................. 29/747, 749, 753, 29/759, 863, 33 M, 33 F, 566.1, 566.8, 760; 254/134 R; 242/615.3, 615.4

(56) References Cited

U.S. PATENT DOCUMENTS 5,484,961 * 1/1996 Itoh et al. ......................... 174/84 C

* cited by examiner

*Primary Examiner*—Lee Young
*Assistant Examiner*—Minh Trinh
(74) *Attorney, Agent, or Firm*—Anthony J. Casella; Gerald E. Hespos; Michael J. Porco

(57) ABSTRACT

To effect accurate positioning and avoid interference of a terminal fitting with a wire guide member. By lifting and lowering guide members 112, 113 formed with Y-shaped wire guide slots 112F, 113F, respectively, a wire W is brought to a terminal mounting position. The wire W and the terminal fitting mounted on the wire W will not interfere with the guide members 112, 113, and the wire W can be more accurately positioned by the Y-shaped wire guide slots 112F, 113F.

4 Claims, 8 Drawing Sheets

METHOD FOR GUIDING A WIRE

This is a divisional of application Ser. No. 08/623,280, filed in Mar. 28, 1996 which is U.S. Pat. No. 5,884,394.

FIELD OF THE INVENTION

The present invention relates to a method and an apparatus for guiding a wire and, more particularly to a method and an apparatus for positioning the wire in a specified position before a terminal fitting is mounted on the wire in a terminal mounting unit.

DESCRIPTION OF THE PRIOR ART

A terminal mounting unit, such as the continuous terminal mounting apparatus disclosed in Japanese Unexamined Utility Model Publication No. 4-78795, has a terminal mounting position where a terminal fitting is mounted at an end of a wire. Terminal fittings can be continuously mounted at ends of wires by automatically feeding the ends of the conveyed wires to the terminal mount position.

When being fed to the terminal mounting unit, the ends of the wires where the terminal fittings are to be mounted need to be accurately positioned. In view of this, the applicant of the present invention proposed a wire guide for guiding a wire (Japanese Unexamined Patent Publication No. 6-236792).

The proposed wire guide comprises a guide means for guiding a wire and an elastic holding means for elastically receiving the guided wire.

The guide means is specifically formed by, e.g. a restricting member secured on a for feeding a wire, or a pair of clamping members for gripping the wire. Further, the elastic holding means is specifically formed by an elastic member mounted on the terminal mounting unit. The guide means is displaceable with respect to the elastic holding means.

The elastic holding means may get caught by the wire and/or the terminal fitting after the terminal mounting operation and while the wire is being withdrawn from the terminal mounting unit. This may lead to a lowered durability of the member forming the elastic holding means and/or a difficult maintenance. Accordingly, in the prior art mentioned above, the durability is improved by elastically holding a wire receiving member of a hard material by an elastic member mounted on the terminal mounting unit.

Another construction in which a wire receiving member is elastically rotated so as to avoid interference with the wire and the terminal fitting is also known (Japanese Unexamined Utility Model Publication No. 1-106093).

However, the above-mentioned wire guides cannot realize both accurate positioning and avoidance of an interference of the terminal fitting with the guide member.

More specifically, in the construction disclosed in Japanese Unexamined Patent Publication No. 6-236792, since the elastic holding means is secured on the terminal mounting unit, if the terminal fitting gets caught in the elastic holding means, either the terminal fitting or the elastic holding means is disadvantageously deformed. On the other hand, since the construction disclosed in Japanese Unexamined Utility Model Publication No. 1-106093 is such that the wire receiving member is merely made rotatable, the accurate positioning of the wire cannot be effected.

Further, in the case that the clamping members for gripping a wire are adopted as the guide means, it is difficult to properly position the center of the wire in the terminal mounting position since the positioning is performed merely by gripping the clamping members. Accordingly, it is difficult to accurately position the wire.

In view of the problems residing in the prior art, an object of the present invention is to provide a method and an apparatus for processing a wire which, during conveyance of the wire, can prevent the terminal fitting from getting caught in an elastic holding means and effect accurate positioning of the wire.

SUMMARY OF THE INVENTION

According to the invention there is provided a method for processing or guiding a wire (W) being conveyed to a processing apparatus that may be operative for mounting a terminal fitting on the wire. The method comprises the step of advancing a guide member from a retracted position. The guide member, in its retracted position, may be located under the wire and at an angle to the longitudinal axis of the wire. In particular the guide member may be transversely below a wire processing position, when the wire is conveyed toward the wire processing position, such as a terminal mounting position. Thus, movement of the guide member is effective for inserting the wire into a wire guide slot of the guide member to position the end of the wire in the wire processing position. The method continues by processing the wire, in particular by mounting the terminal fitting on the wire, and releasing the wire from the guide member.

According to a preferred embodiment of the invention, the method further comprises before the step of processing, the step of elastically holding the wire by means of an elastic means in the wire guide slot, in particular in an intermediate position thereof.

Preferably, the step of releasing the wire comprises the step of retracting the guide member after the mounting of the terminal fitting, thereby bringing the wire out of the wire guide slot, in particular to release the wire.

According to the invention there is further provided an apparatus for processing a wire, in particular for guiding a wire being conveyed. The wire may be one on which a terminal fitting is to be mounted such that an end thereof is located in a wire processing position, such as a terminal mounting position. The apparatus comprises a wire processing means. The apparatus also includes a guide member which comprises a wire guide slot into which the wire to be positioned is insertable. The guide member is shiftable to a guiding position and to a retracted position. Preferably the guide member is shifted at an angle, preferably transversely to the axis of the wire. The retracted position preferably is below the terminal mounting position particularly while bringing the wire out of the wire guide slot. The apparatus also includes means for shifting the guide member between the retracted position and the guiding position.

According to a preferred embodiment of the invention, the wire guide slot is substantially Y-shaped. The guide member preferably is advanceable or shiftable to the guiding position such that the end of the wire can be located in the wire processing position, while the wire is inserted into the wire guide slot. The guide member is retractable to the retracted position, a distance a distance from and/or below the wire processing position, while the wire is brought out of the wire guide slot.

Preferably, there is provided an elastic member mounted on the guide member for elastically receiving the wire, preferably in an intermediate position in the wire guide slot.

Further preferably, the guide member comprises a first guide member being located in the vicinity of the wire processing means, in particular a terminal mounting unit.

The first guide member is adapted to position the wire. The guide member preferably further comprises a second guide member being opposed to the first guide member with respect to a longitudinal direction of the wire and adapted to guide the wire into the first guide member.

Still further preferably, the first guide member is detachable from and/or movable with respect to the second guide member, in particular along the longitudinal direction of the wire to be processed, so as to come closer to the wire processing position. Therefore it is easily possible to adapt the wire guide slot (in particular its width) of the first member to the thickness of the wire to be processed, in particular by replacing the first guide member that has a wrong or mismatched wire guide slot with a first guide member that has a correct or adapted wire guide slot.

According to a further preferred embodiment, the first guide member has a width selected in accordance with the thickness of the wire to be processed, and particularly a width that is necessary and sufficient to position the wire in the wire processing means. The second guide member may have a guiding surface, in particular a curved outer shape to guide the wire to the first guide member, in particular into its wire guide slot.

Further preferably, the width of the wire guide slot of the first guide member is adapted to the width of the wire to be actually processed and/or wherein the width of the wire guide slot of the second guide member is adapted to the thickness of the thickest wire to be processed.

Still further preferably, the guide member is mounted on a detachable block, in particular being detachably mountable on an actuator.

According to a preferred embodiment of the invention, there is provided a method for guiding a wire being conveyed on which a terminal fitting is to be mounted such that an end thereof is located in a terminal mounting position. The method includes the step of bringing a guide member to its retracted position below the terminal mounting position, the guide member comprising a substantially Y-shaped wire guide slot into which the wire to be positioned is inserted. The guide member further includes an elastic member being mounted on the guide member in an intermediate position of the wire guide slot for elastically holding the wire in the wire guide slot.

The method includes lifting the guide member when the wire is conveyed toward the terminal mounting position, thereby inserting the wire into the wire guide slot to position the end of the wire in the terminal mounting position, and lowering the guide member after the mounting of the terminal fitting, thereby bringing the wire out of the wire guide slot to release the wire.

According to a further preferred embodiment of the invention, there is provided an apparatus for guiding a wire being conveyed on which a terminal fitting is to be mounted such that an end thereof is located in a terminal mounting position. The apparatus includes a guide member which comprises a substantially Y-shaped wire guide slot into which the wire to be positioned is inserted. The guide member is shiftable to a guiding position where the end of the wire can be located in the terminal mounting position while lifting the wire inserted into the wire guide slot. The guide member also is shiftable to a retracted position below the terminal mounting position while bringing the wire out of the wire guide slot. The apparatus also includes an elastic member mounted on the guide member for elastically receiving the wire inserted into the wire guide slot in the intermediate position of the wire guide slot. The apparatus further comprises means for shifting the guide member from the retracted position to the guiding position when the wire is conveyed and lowering the guide member after the mounting of the terminal fitting so as to release the wire by bringing the wire out of the wire guide slot.

According to the above method or apparatus, when the wire on which the terminal fitting is to be mounted is conveyed to the terminal mounting unit, the guide member is moved to the wire processing position, in particular the guide member is lifted such that the wire is inserted into the wire guide slot, thereby guiding the wire while restraining it from being bent. Accordingly, the end of the wire is brought to the terminal mounting position of the terminal mounting unit. At this time, preferably the elastic member moves integrally with the guide member, thereby elastically receiving the wire before the mounting of the terminal fitting in the terminal mounting unit. Further, when a downward acting load is exerted on the wire during the terminal mounting operation, this load is transmitted to the elastic member and the wire is elastically lowered by a very small distance. In this way, the load is cushioned.

On the other hand, upon completion of the terminal mounting operation by the terminal mounting unit, the guide member is moved to the retracted position, in particular lowered to release the wire. At this time, the elastic member shifts to its retracted position integrally with the guide member, with the result that it securely parts from the wire.

As described above, the elastic member holds the wire W in a similar manner as and in particular with the wire guides, cushioning the load acting on the coated wire W, and is located in the guide member. Accordingly, when the guide member is displaced to its retracted position, the elastic member will not get caught by the wire or the terminal fitting mounted on the wire. On the other hand, by being lifted by the guide member, the wire conveyed to the terminal mounting unit is guided into the guide slot. Accordingly, the wire is so guided as not to be bent, and is accurately brought to the terminal mounting position. Thus, the invention has remarkable effects that the terminal fitting does not get caught in the elastic holding means during conveyance of the wire having the terminal fitting mounted thereon, and that the wire can be accurately positioned.

Preferably, the guide member comprises a first guide member which is located in the vicinity of the terminal mounting unit and adapted to position the wire and a second guide member which is opposed to the first guide member with respect to a longitudinal direction of the wire and adapted to guide the first guide member, the first guide member being movable with respect to the second guide member along the longitudinal direction so as to come closer to the terminal mounting position.

Thus, even if the terminal mounting unit is changed to the one of a different kind, the mount position of the first guide member can be so changed as to conform to the terminal mounting position of the newly set terminal mounting unit. Thus, the wire guiding device advantageously performs accurate positioning for a number of different kinds of terminal mounting units.

Further preferably, the first guide member has a width necessary and sufficient to position the wire in the terminal mounting unit, and the second guide member has such an outer shape that it can guide the wire to the first guide member.

Accordingly, the first guide member can be brought as close to the terminal mounting position of the terminal mounting unit as possible, and the in particular coated wire can be guided to the first guide member by the second guide member, thereby advantageously restraining the wire from being bent as much as possible and thus enabling accurate positioning.

DETAILED DESCRIPTION OF THE PREFERRED EMBODIMENTS

First, a continuous terminal mounting apparatus according to the invention is summarily described with reference to FIG. 9 which is a schematic plan view of the apparatus incorporating a wire guiding device as one embodiment of the invention.

Figure 9:
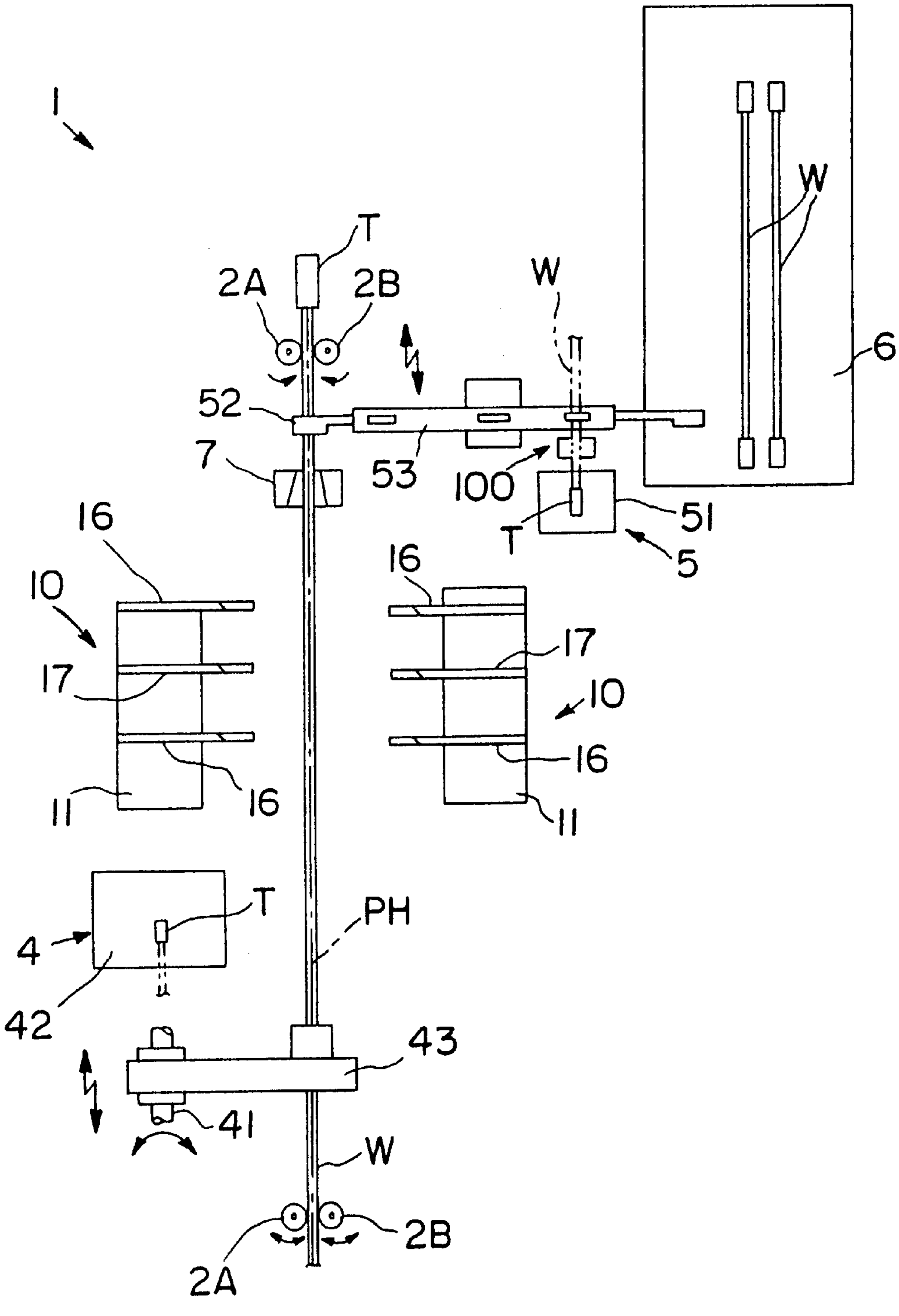
FIG. 9 is a schematic plan view of a continuous terminal mounting apparatus incorporating the wire guiding device.

With reference to FIG. 9, the continuous terminal mounting apparatus 1 includes a pair of feed rollers 2A, 2B, a peeling device 10, and a pair of terminal mounting devices 4, 5. The feed rollers 2A, 2B feed a coated or insulated wire W drawn from an unillustrated feed roller along a wire conveyance path PH vertically extending in FIG. 9 while measuring the coated wire W. The peeling device 10 is disposed in an intermediate position along the conveyance path PH. The terminal mounting devices 4, 5 are spaced apart along the conveyance path PH with the peeling device 10 therebetween and adapted to mount a cramping terminal T at an end of the coated wire W.

The terminal mounting device 4 disposed at an upstream side of the conveyance path PH includes a movable clamp 43 for gripping the coated wire W in a position upstream from the peeling device 10 and rotating about a shaft 41 to convey an end of the coated wire W cut by the peeling device 10 to a terminal mounting unit 42. On the other hand, the terminal mounting device 5 disposed at a downstream side of the conveyance path PH includes a plethora of movable clamps 52 for gripping the coated wire W in a position downstream from the peeling device 10 and conveying an end of the coated wire W cut by the peeling device 10 to a terminal mounting unit 51. The movable clamps 52 are so secured on a disk-shaped index table 53 as to project radially outward therefrom. As the index table 53 turns, the movable clamps 52 convey the cut coated wires W to a terminal mounting position and then to a collecting container 6. Between the movable clamps 52 and the peeling device 10, there is disposed a conical guide member 7 for guiding the end of the coated wire W along the conveyance path PH.

The peeling device 10 includes a pair of carriers 11 which are disposed on the opposite sides of the conveyance path PH and movable closer to and away from each other in a direction normal to the extension of the conveyance path PH. Each carrier 11 carries a peeling blade 16 and a cutting blade 17. When the carriers 11 move closer to each other, the coated wire W is cut by the cutting blade 17 and an insulation of the coated wire W is peeled by the peeling blade 16. While the carriers 11 move closer to each other to cut the coated wire W, the movable clamp 43 and the index table 53 move away from each other along the conveyance path PH. This movement of the movable clamp 43 and the index table 53 causes the end of the coated wire W to be withdrawn from the corresponding terminal mounting units 4 and 5 after the terminal mounting operation.

In order to guide the ends of the coated wire W to proper positions in the respective terminal mounting devices 4 and 5, a wire guiding device 100 of this embodiment is mounted on the downstream terminal mounting unit 51.

Figure 1:
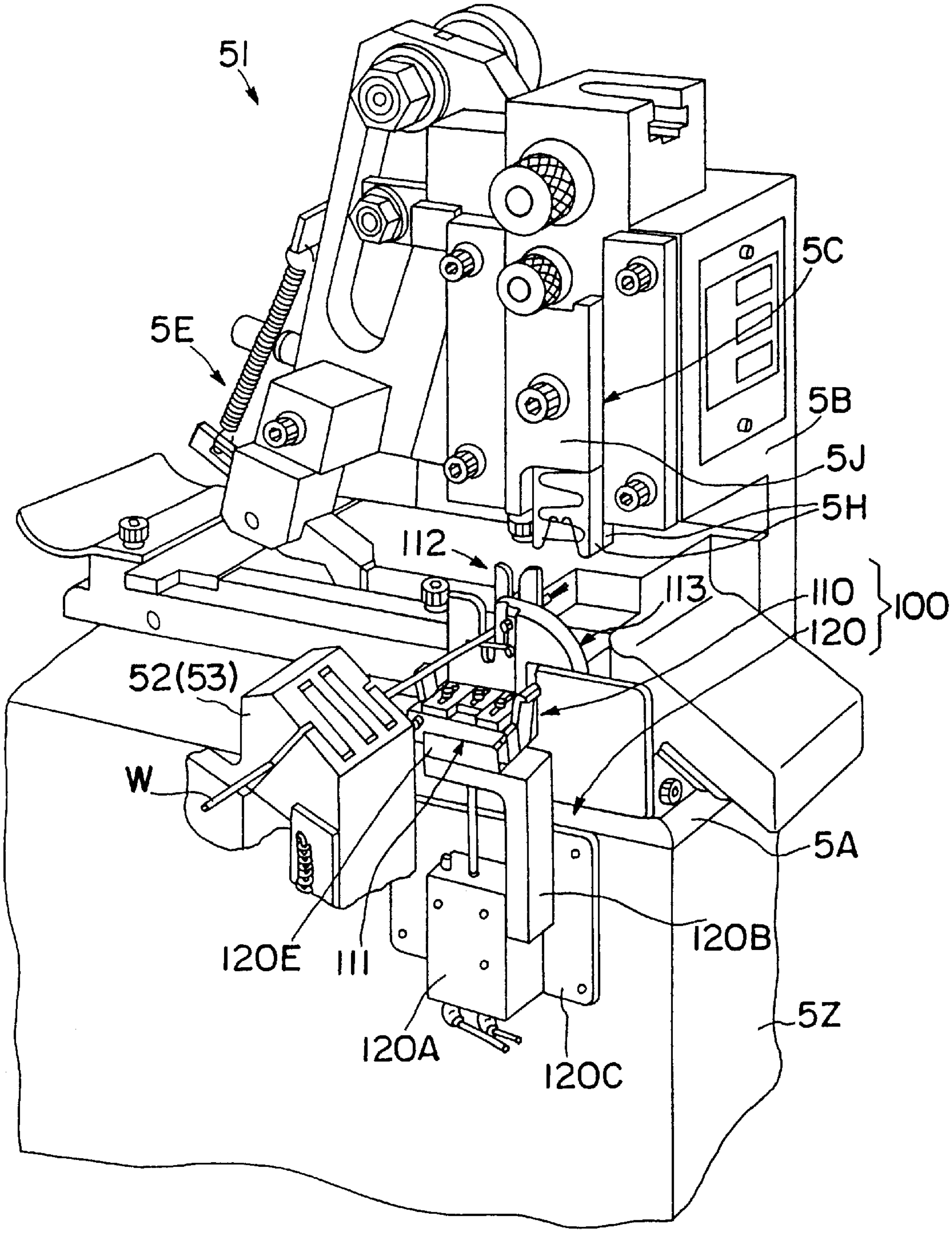
FIG. 1 is a perspective view of a terminal mounting apparatus equipped with a wire guiding device as one embodiment of the invention when a guide unit of the wire guiding device is in its guiding position.
Figure 2:
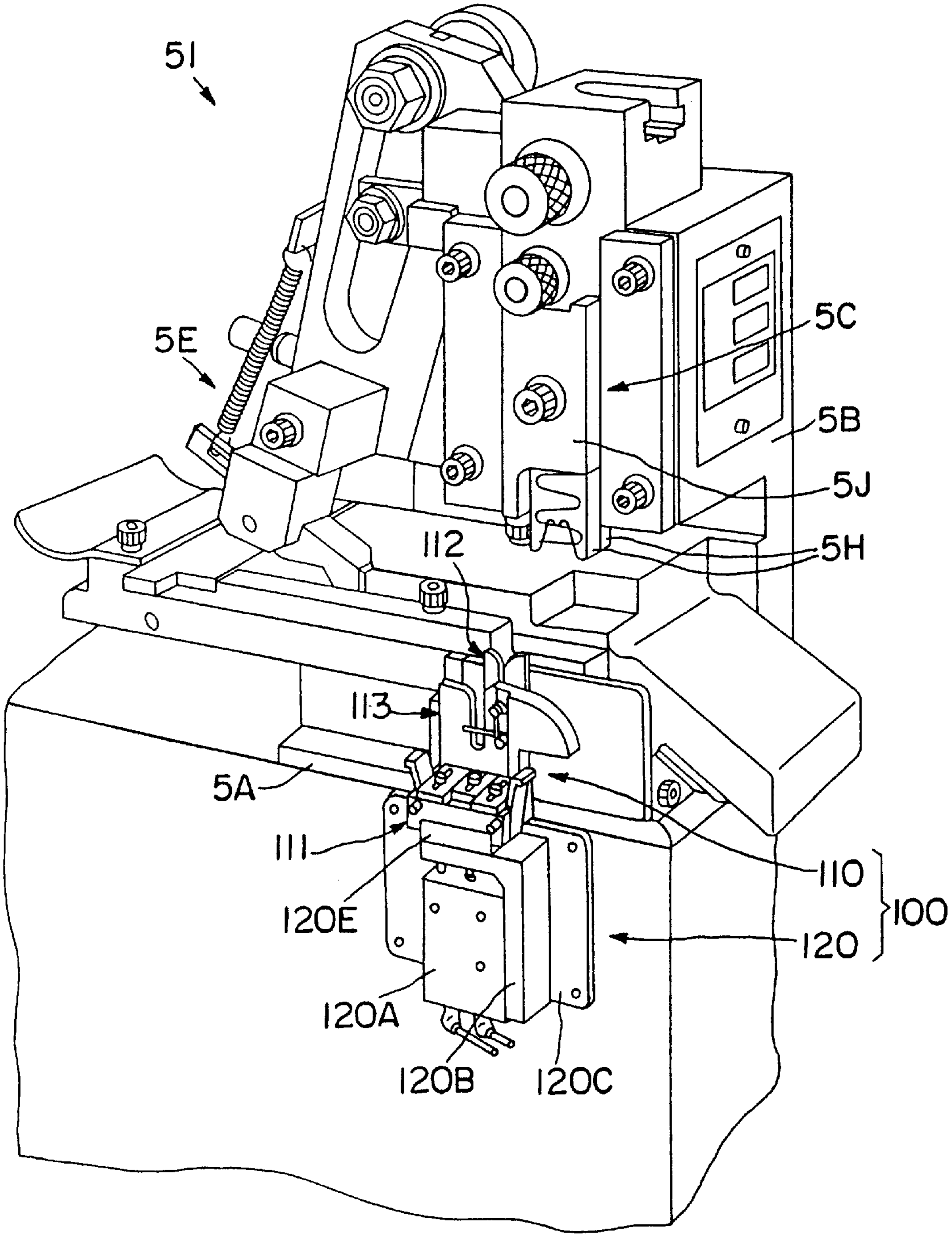
FIG. 2 is a perspective view of the terminal mounting apparatus when the guide unit is in its retracted position.
Figure 6:
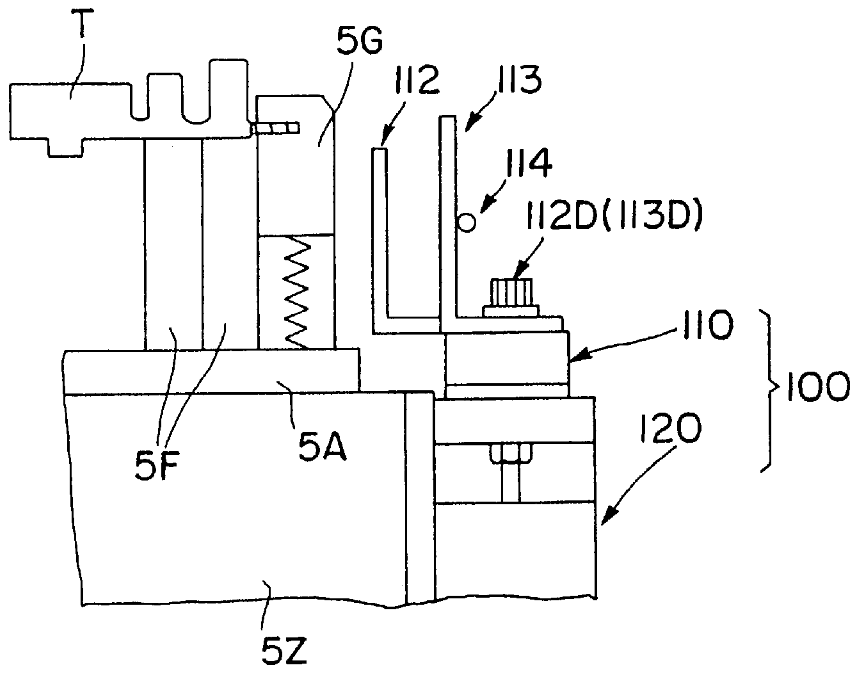
FIG. 6 is a schematic side view of the wire guiding device of FIG. 1 mounted on the terminal mounting unit.

First, with reference to FIGS. 1 and 2, the terminal mounting unit 51 is of side feed type, and includes a base 5A secured on a frame 5Z of the terminal mounting device 5, a main body 5B integrally formed with the base 5A, a shank unit 5C mounted on the main body 5B and adapted to specify a terminal mounting position where a terminal fitting is to be mounted, and a terminal feeding unit 5E for feeding a terminal fitting T, arranged in particular in a chain of terminal fittings to the terminal mounting position specified by the shank unit 5C. A crimper 5H and a cutoff punch 5J are mounted on the shank unit 5C. Below the shank unit 5C, an anvil 5F and a slide cutter 5G which are mounted on the base 5A are opposed to each other as shown in FIG. 6. The shank unit 5C mounts a terminal fitting T fed on the anvil 5F and the slide cutter 5G is mounted on an end of a coated wire W conveyed by the index table 53. Thus, the terminal fitting T can be secured on the end of the coated wire W while being separated from the chain.

Figure 3:
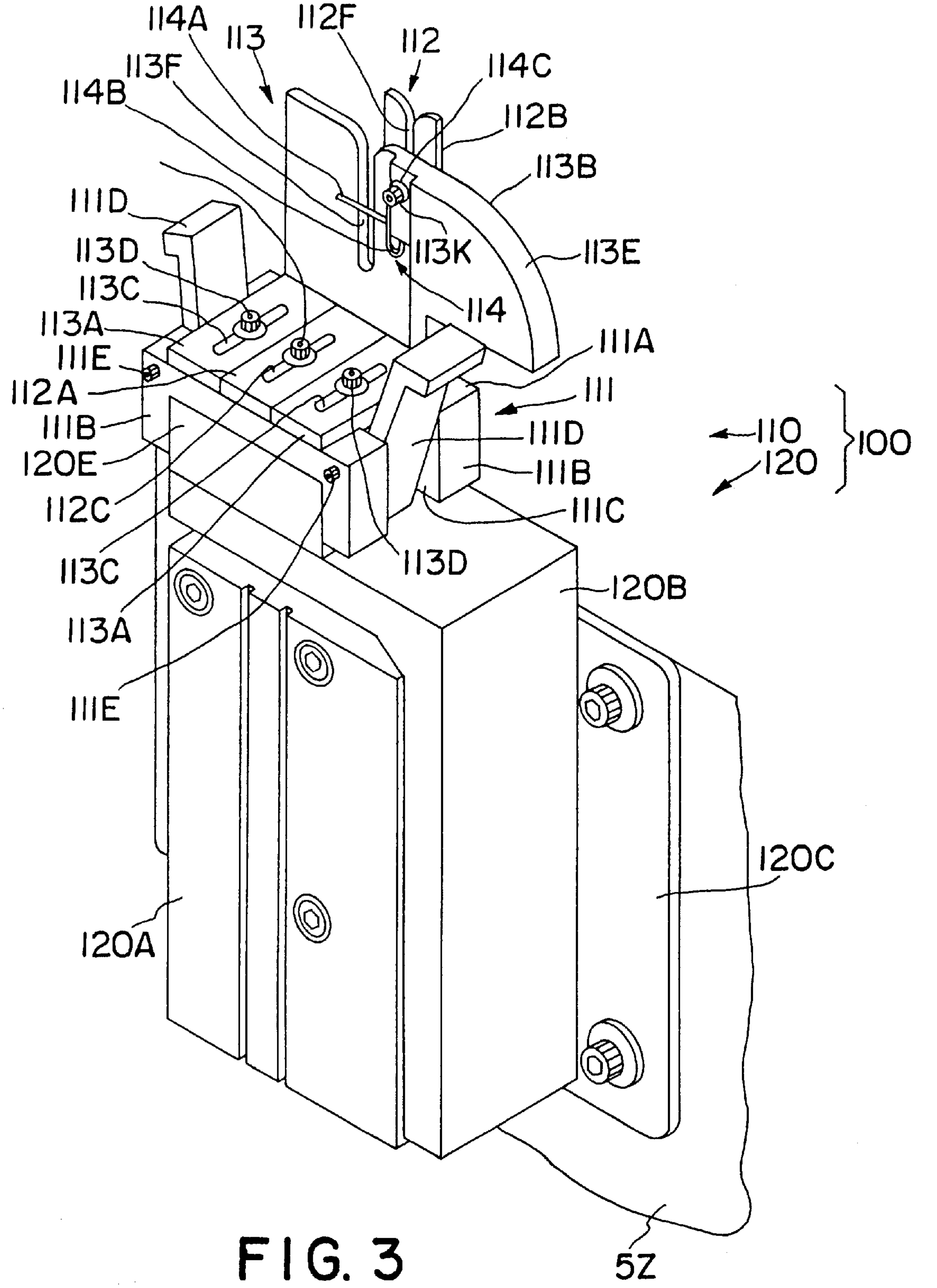
FIG. 3 is a perspective view showing the exterior of the wire guiding device of FIG. 1, FIGS. 4 and 5 are exploded perspective views of an essential portion of the wire guide device of FIG. 1.
Figure 4:
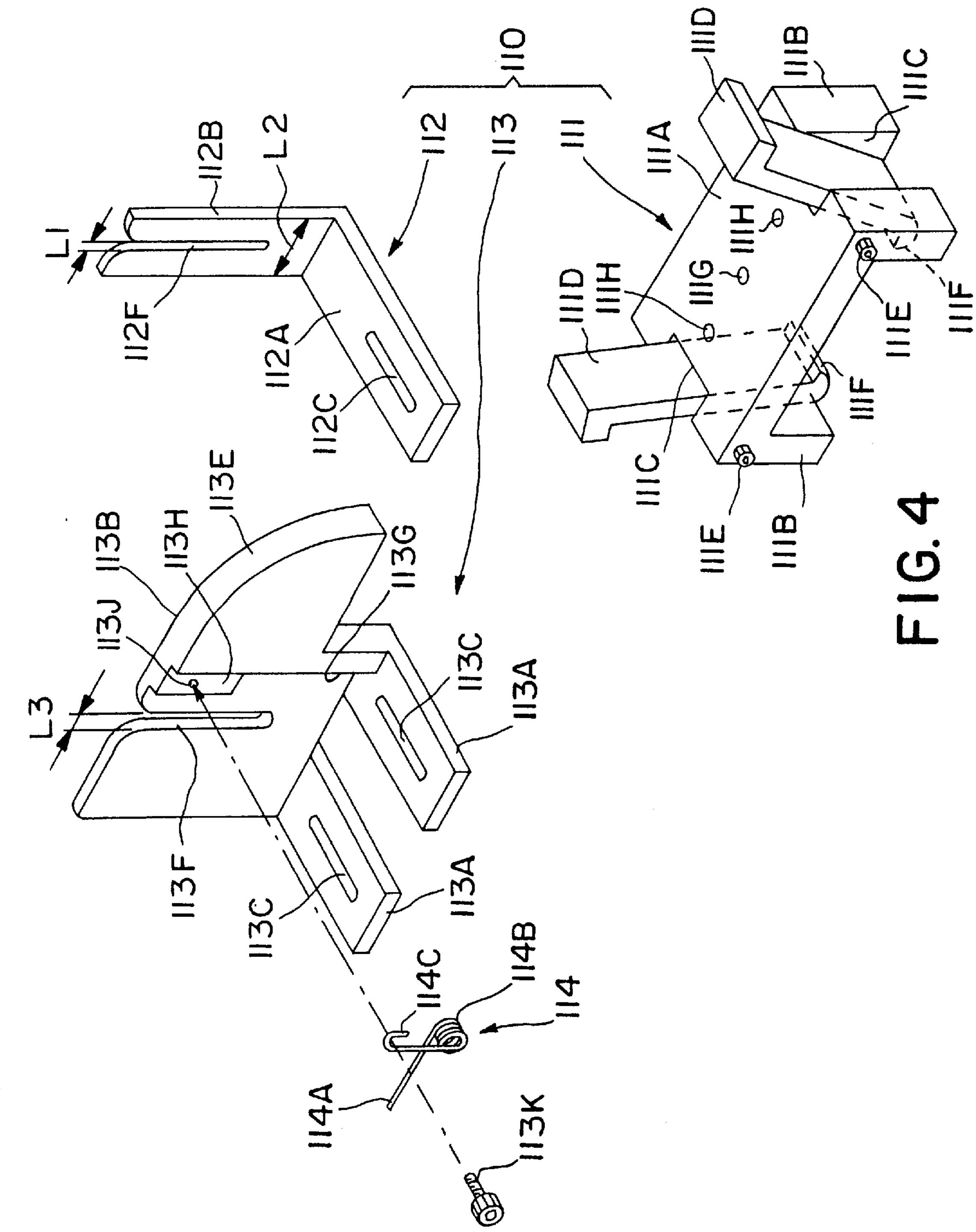
Figure 5:
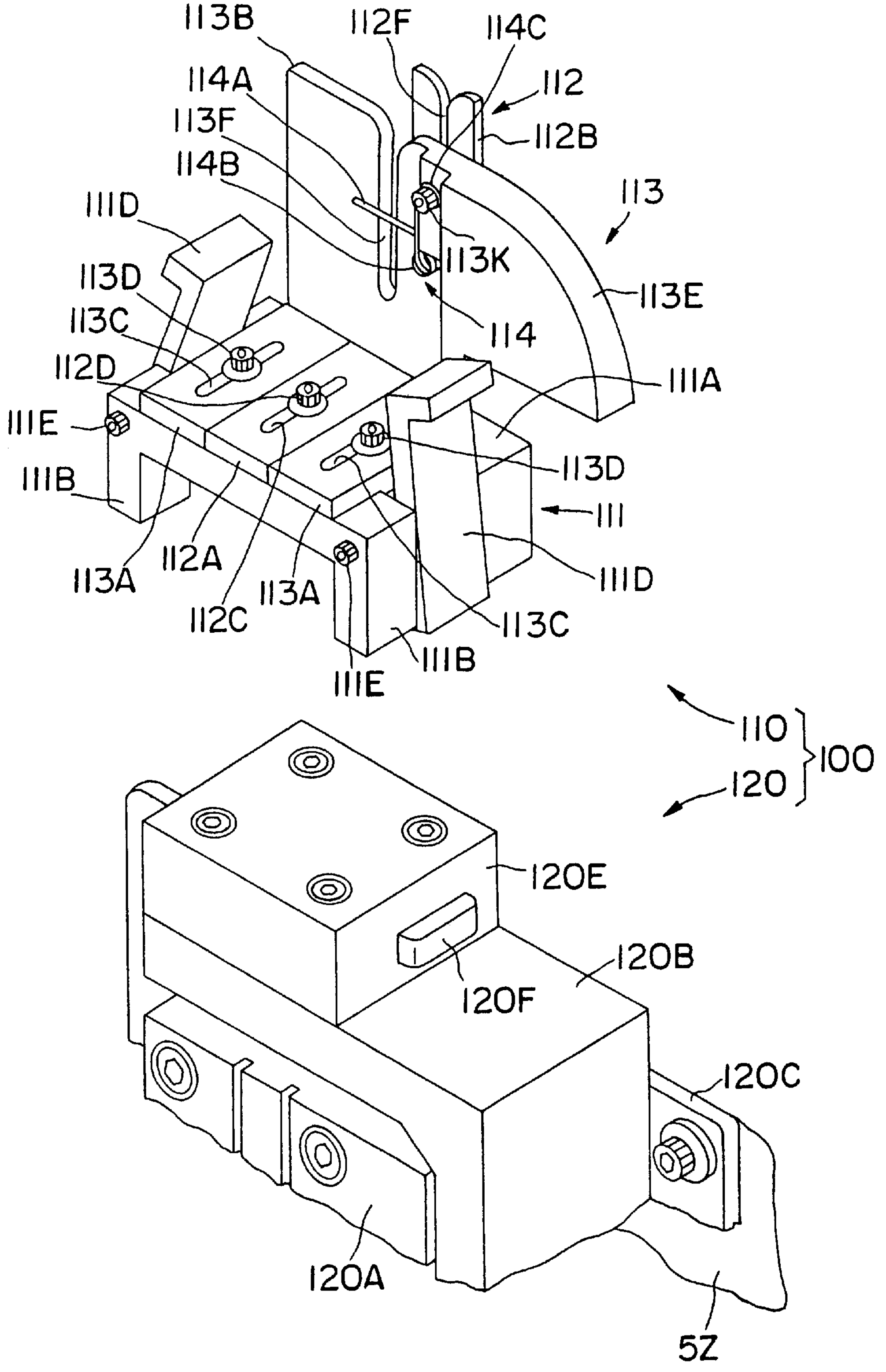

With reference to FIGS. 3 to 5, the wire guiding device 100 of this embodiment includes a guide unit 110 for guiding the coated wire W and an air actuator 120 for moving the guide unit 110 upward and downward.

The guide unit 110 includes a detachable block 111, first and second guide members 112 and 113 secured on the detachable block 111 by bolts.

The detachable block 111 is of metal and includes a substantially rectangular-shaped ceiling portion 111A and side portions 111B extending from the opposite longitudinal ends of the ceiling portion 111A. The ceiling portion 111A and the side portions 111B are integrally or unitarily formed. A pair of notches 111C are formed at the opposite longitudinal ends of the detachable block 111, and a lever 111D is mounted in each notch 111C. The levers 111D are rotatably supported by screws 111E which extend in the widthwise direction from side portions of the ceiling portion 111A and are spirally fitted into the levers 111D, and are rotatably biased about the screws 111E by an unillustrated spring member such that the bottom ends thereof come closer to each other. At the lower end of each lever 111 is formed an engaging claw 111F which is engageable with a locking portion 120E of the actuator 120 to be described later. Further, the ceiling portion 111A of the detachable block 111 is formed with three threaded holes 111H, 111G as shown in FIG. 4 for fastening respective guide members 112, 113, to be described later. The threaded holes 111H, 111G are spaced apart at specified intervals in the longitudinal direction of the ceiling portion 111A.

The first guide member 112 is a substantially L-shaped metal member, and includes a mount portion 112A to be mounted on the ceiling portion 111A of the detachable block 111 and a guide portion 112B extending from one end of the mount portion 112A.

The mount portion 112A is a substantially rectangular-shaped plate member and is formed with an oblong hole 112C extending its longitudinal direction. A bolt 112D (see FIG. 3) is inserted through the hole 112C and spirally fitted into the threaded hole 111G located in the center of the ceiling portion 111A. In this way, the first guide member 112 can be secured such that its position is adjustable along the longitudinal direction of the oblong hole 112C.

The guide portion 112B is a thin plate member extending upward. A substantially Y-shaped wire guide slot 112F which widens at its upper end is formed in the guide portion 112B. The Y-shaped wire guide slot 112F preferably comprises a lower portion having a constant width and an upper portion having a variable width becoming larger or widening towards the top of the wire guide slot with a constant or variable slope. In this embodiment, the guide slot 112F has a width L1 necessary and sufficient for the coated wire W to be inserted therethrough. Further, a width L2 of the guide portion 112B is set sufficient to position the coated wire W in the terminal mounting position of the terminal mounting unit 51.

The second guide member 113 includes a pair of mount portions 113A for guiding the mount portion 112A of the first guide member 112 therebetween, and a guide portion 113B extending upright from ends of the mount portions 113A.

Each mount portion 113A is a plate member of a substantially rectangular shape corresponding to the mount portion 112A, and is formed with an oblong hole 113C extending in its longitudinal direction. Bolts 113D (see FIG. 5) are inserted through the oblong holes 113C and spirally fitted or screwed or threadingly engaged into the threaded holes 111H at the opposite sides of the ceiling portion 111A. In this way, similar to the first guide member 112, the second guide member 113 can be secured such that its position is adjustable along the longitudinal direction of the oblong holes 113C.

The guide portion 113B is a plate member having an arcuate face 113E for receiving the coated wire W conveyed to the terminal mounting unit 51, and a substantially Y-shaped wire guide slot 113F which widens at its upper end for receiving the coated wire W guided by the arcuate face 113E. The wire guide slot 113F has preferably a similar shape as the wire guide slot 112F. In order to facilitate guiding of the coated wire W to the guide slot 112F of the first guide member 112, a width L3 of the guide slot 113F is set larger than the width L1 of the guide slot 112F. Accordingly, even if the conveyed coated wire W is slightly bent or curved, it can be securely guided into the guide slot 113 and the end thereof can be guided into the guide slot 112F. A part of the guide portion 113B where the guide slot 113F is formed (thin part) is thinner than a part thereof where the arcuate face 113E is formed (thick part), thereby defining a shoulder portion 113G therebetween. A rectangular projection 113H thinner than the thick part is formed at the upper end corner of the thin part, contiguously with the shoulder portion 113G. A threaded hole 113J is formed in the projection 113H, and a torsion spring 114 as an elastic member is mounted between the projection 113H and a bolt 113K formed with a hexagonal hole which is spirally fittable into the threaded hole 113J.

More specifically and in a preferred construction, the torsion spring 114 includes an engaging end 114A which substantially linearly extends, a coiled portion 114B which is coiled clockwise in FIG. 4 with the engaging end 114A as its base end, and a hooked portion 114C which is formed at the other end of the coiled portion 114B and extends in a direction normal to the extension of the engaging end 114A. The bolt 113K is spirally fitted into the threaded hole 113J through the hooked portion 114C. Accordingly, the coiled portion 114B is mounted between the projection 113H and the shoulder portion 113G, and the engaging end 114A crosses the guide slot 113F in its intermediate position in slidable contact with the front surface of the guide portion 113B. As a preferred result, the engaging end 114A is capable of elastically receiving the coated wire W guided into the guide slot 113F in the intermediate position of the guide slot 113F.

A plurality of kinds of guide units 110 as described above are prepared in conformity with kinds of terminal fittings to be mounted and coated wires W. As shown in FIG. 5, those guide units 110 can be easily mounted and replaced on the air actuator 120 to be described next.

Next, with reference to FIGS. 3 and 5, the air actuator 120 includes an air cylinder 120A and a substantially L-shaped elevating member 120B which is moved upward and downward by the air cylinder 120A.

The air cylinder 120A is secured, via a mount plate 120C, on the front surface of the frame 5Z on which the terminal mounting unit 51 is mounted. The air cylinder 120A is adapted to move the elevating member 120B upward and downward in synchronism with the wire conveying operation by the index table 53 and the terminal fitting mounting operation by the terminal mounting unit 51 under the control of an unillustrated controller.

The elevating member 120B is provided with a block-shaped locking portion 120E on its upper surface. The locking portion 120E includes ear portions 120F (only one ear portion is illustrated in FIG. 5) on its opposite side surfaces. By engaging the engaging claws 111F (see FIG. 4) formed at the levers 111D of the guide unit 110 with the locking portion 120E, the guide unit 110 is mounted on the elevating member 120B.

In the above construction, when the coated wire W on which the terminal fitting T is to be mounted is conveyed to the terminal mounting unit 51, the guide unit 110 moves upward as shown in FIG. 1 and the coated wire W is guided into the guide slots 112F, 113F while restraining it from being bent. This enables the coated wire W to be accurately brought to the terminal mounting position of the terminal mounting unit 51. At this time, the engaging end 114A of the torsion spring 114 is displaced integrally with the guide unit 110, thereby elastically receiving the coated wire W before the terminal fitting T is mounted by the terminal mounting unit 51. If a downward acting load is exerted on the coated wire W during the terminal mounting operation, this load is transmitted to the engaging end 114A of the torsion spring 114 and the coated wire W is moved downward by a very small distance to cushion the load.

On the other hand, upon completion of mounting of the terminal fitting T by the terminal mounting unit 51, the guide unit 110 moves downward as shown in FIG. 2, thereby releasing the coated wire W. At this stage, the engaging end 114A of the torsion spring 114 is displaced to its retracted position integrally with the guide unit 110, with the result that it can securely part from the coated wire W.

As described above, in the construction of this embodiment, the engaging end 114A of the torsion spring 114 holds the coated wire W in a similar manner and in particular together with the wire guide members, cushioning the load acting on the coated wire W, and is located in the guide unit 110. Accordingly, when the guide unit 110 is displaced to its retracted position, the engaging end 114A will not get caught by the coated wire W or the mounted terminal fitting T. On the other hand, by being lifted by the guide unit 110, the coated wire W conveyed to the terminal mounting unit 51 is guided into the respective guide slots 112F and 113F by the arcuate face 113E formed on the second guide member 113. Accordingly, the coated wire W is so guided as not to be bent, and the end thereof is accurately positioned in the terminal mounting position. Thus, this embodiment has remarkable effects that the terminal fitting T does not get caught in the elastic holding means during conveyance of the coated wire W having the terminal fitting T mounted thereon, and that the coated wire W can be accurately positioned.

Further, the first guide member 112 can be located as close to the terminal mounting position of the terminal mounting unit 51 as possible, and the coated wire W can be guided to the first guide member 112 by the second guide member 113. Thus, in this embodiment, the bending of the coated wire W is restrained as much as possible, thereby enabling accurate positioning.

Figure 7:
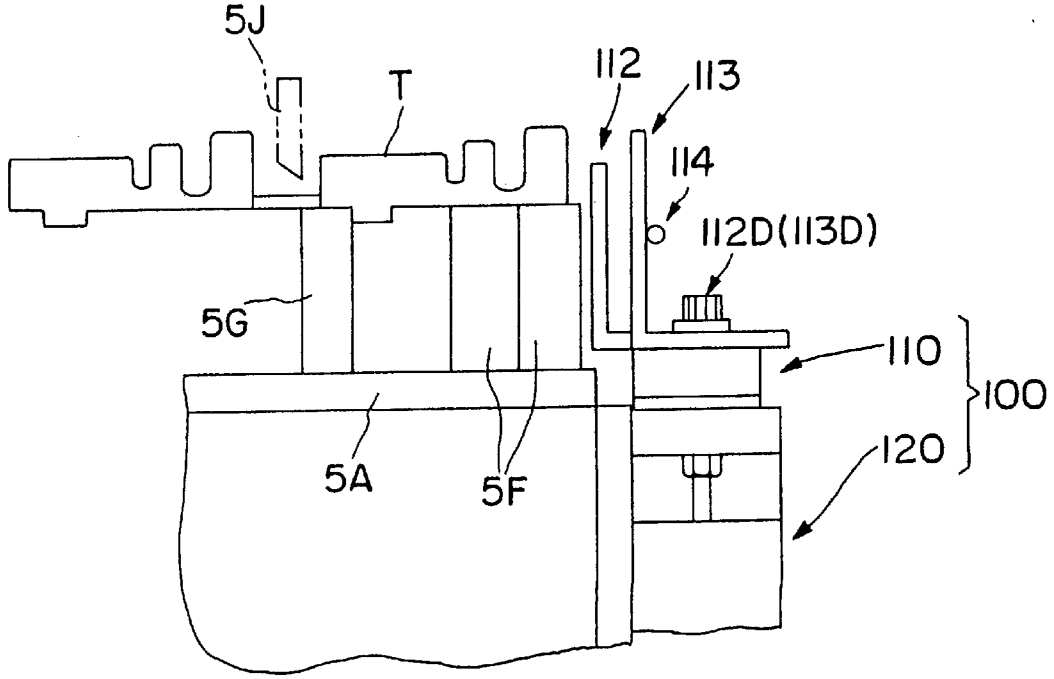
FIGS. 7 and 8 are a schematic side view and a perspective view of the wire guiding device of FIG. 1 mounted on a terminal mounting unit of so-called end feed type.
Figure 8:
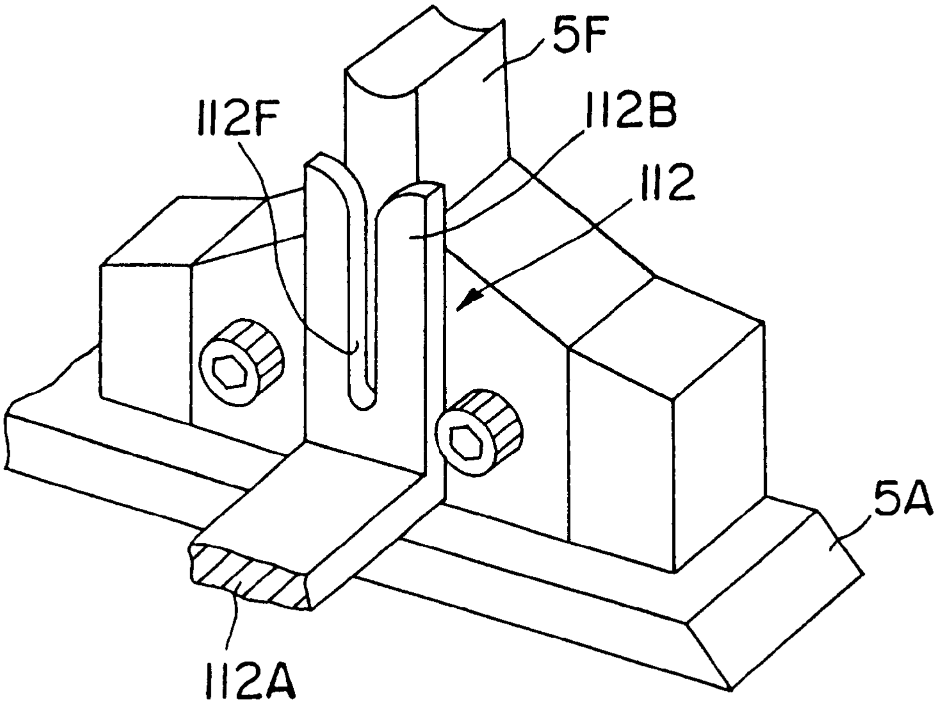

Furthermore, in the construction of this embodiment, the first guide member 112 is movable closer to the terminal mounting position with respect to the second guide member 113. Accordingly, even if the terminal mounting unit 51 is of so-called end feed type in which terminal fittings T are fed along their longitudinal direction as shown in FIGS. 7 and 8, the mount position of the first guide member 112 can be so changed as to conform to the terminal mounting position of the terminal mounting unit 51 by changing the relative position of the oblong hole 112 and the bolt 112D. Accordingly, the wire guiding device 100 advantageously performs accurate positioning for a number of different kinds of terminal mounting units 51. It should be appreciated that since the construction of the terminal mounting unit of FIGS. 7 and 8 is similar to that of FIGS. 1 to 6, no description is given to elements corresponding to those of the terminal mounting unit of FIG. 1 by identifying them by the same reference numerals as in FIGS. 1 and 6.

Further, in the construction of this embodiment, the guide portion 112B of the first guide member 112 has a width L2 necessary and sufficient to position the coated wire W in the terminal mounting position of the terminal mounting unit 51. Accordingly, as shown in FIG. 8, the guide portion 112B can be located as close to a mold (e.g. anvil 5F) as possible by being fitted in a narrow space, with the result that the coated wire W can be accurately positioned.

LIST OF REFERENCE NUMERALS

51 . . . Terminal Mounting Unit
100 . . . Wire Guiding Device
110 . . . Guide Unit (Guide Member)
112 . . . First Guide Member
112F . . . Wire Guide Slot
113 . . . Second Guide Member
113F . . . Wire Guide Slot
114 . . . Torsion Spring (Elastic Member)
120 . . . Air Actuator (Guide Member Elevating Means)

What is claimed is:

1. A method for processing a wire, said wire having a longitudinal direction and an end, said method comprising the steps of:

providing a wire processing apparatus having a wire processing position for processing said end of said wire;

providing a guide member assembly with first and second spaced apart parallel movable guide members in proximity to the wire processing position, the movable guide members having a Y-shaped slot with a wide opened end and a narrow closed end, an elastic member extending across one of the slots at a location between the wide opened end and the narrow closed end of the slot;

moving the guide members in unison parallel to the slots away from the wiring processing position and into a retracted position;

conveying at least the end of the wire substantially transverse to the longitudinal direction of the wire to position the end of the wire in the wire processing position;

advancing the guide members in unison parallel to the slots from the retracted position thereof toward the longitudinal axis of the wire when the wire is in the wire processing position, thereby inserting the wire into the slots of the guide members sufficiently for elastically holding the wire by means of the elastic member in the one said wire guide slot and to position the end of the wire in the wire processing position, processing the wire, and lowering the guide members in unison to the retracted position after processing the wire for releasing the wire from the guide members, and moving the processed wire transverse to the longitudinal direction of the wire from the wire processing position.

2. A method for processing a wire in a wire processing position of a wire processing apparatus, said wire having a longitudinal direction and an end, said method comprising the steps of:

providing first and second spaced apart substantially parallel movable guide members in proximity to the wire processing position, said first and second guide members each including a slot dimensioned for receiving the wire therein, said slots being substantially parallel and at least partially registered with one another, each said slot having an open end and a closed end;

moving the guide members in unison parallel to the slots, away from the wire processing position and into a retracted position;

conveying the wire transverse to the longitudinal direction of the wire such that the end of the wire is in the wire processing position;

moving the guide members parallel to the slots from the retracted position toward the wire processing position when the wire end is conveyed into the wire processing position, such that the slots of the guide members receive the wire at spaced apart locations on the wire in proximity to the end of the wire;

processing the end of the wire;

moving the guide members to the retracted position after processing the end of the wire; and moving the wire and the terminal fitting mounted thereon from the terminal mounting position.

3. The method of claim 2, wherein the first and second guide members are adjustably mounted relative to one another, and wherein the method further comprises the step of adjusting the space between the guide members.

4. The method of claim 3, wherein the step of processing the end of the wire comprises crimping a terminal fitting to the end of the wire.

* * * * *